3,845,090
PROCESS FOR THE PRODUCTION OF ORGANOSILOXANE-OXYALKYLENE-BLOCKCOPOLYMERS

Siegfried Nitzsche, Peter Huber, and Ewald Pirson, Burghausen, Germany, assignors to Wacker-Chemie GmbH, Munich, Germany
No Drawing. Filed May 31, 1973, Ser. No. 365,771
Claims priority, application Germany, June 2, 1972,
P 22 26 826.4
Int. Cl. C07f 7/18
U.S. Cl. 260—448.8 R      3 Claims

ABSTRACT OF THE DISCLOSURE

The invention relates to the preparation of organopolysiloxane-oxyalkylene-blockcopolymers by reacting organopolysiloxanes having Si-bonded hydrogen atoms with polyoxyalkylene compounds having at least one alcoholic hydroxyl group in the presence of an insoluble alkali substance having a surface area of from 20 m.²/g. to 800 m.²/g. and a pH value of from 7.5 to 10.0 at 18° C. in a 10 percent by weight aqueous suspension.

---

The present invention relates to a certain class of alkali substances as catalysts and more particularly to a process for preparing organosiloxane-oxyalkylene-blockcopolymers in which the organopolysiloxanes having Si-bonded hydrogen atoms are reacted with polyoxyalkylene compounds having at least one alcoholic hydroxyl group in the presence of a catalytic amount of a certain class of alkali substances to form a copolymer in which the polyoxyalkylene blocks are linked to the organopolysiloxane blocks by an Si-O-C-bond.

Heretofore organosiloxane - oxyalkylene-blockcopolymers in which the polyoxyalkylene blocks were linked to the organopolysiloxane blocks by an Si-O-C-bond have been prepared from the reaction of organopolysiloxanes having Si-bonded hydrogen atoms with polyoxyalkylene compounds having at least one alcoholic hydroxyl group in the presence of catalysts, such as alkali substances (see French Pat. 1,328,546 and Great Britain Pat. 1,058,159). In comparison with the processes known heretofore, the process of this invention has the particular advantage that Si-O-C-bonds are formed instead of siloxane groups as a result of the reaction between Si-bonded hydrogen atoms of the organopolysiloxane and the alcoholic hydroxyl groups of the polyoxyalkylene compounds. In addition the formation of siloxane groups as a result of the splitting off of already formed Si-O-C-bonds with simultaneously equilibration is avoided. Also the possibility that excessive cross-linking, or the formation of jelled products is eliminated. Another advantage of this process is that the catalysts used herein can easily be removed from the reaction vessel by a simple filtration means. In the process of this invention the alkalinity of the catalyst causes equilibration of the organopolysiloxanes immediately prior to, or simultaneously with the reaction of the organopolysiloxanes with the polyoxyalkylene compounds having at least one alcoholic hydroxyl group, thereby obviating many of the disadvantages of the processes used heretofore.

Therefore, it is an object of this invention to provide a process for preparing organosiloxane-oxyalkylene-blockcopolymers. Another object of this invention is to provide a process for preparing organosiloxane-oxyalkylene-blockcopolymers in which Si-O-C-bonds are obtained through the reaction of Si-bonded hydrogen atoms and alcoholic hydroxyl groups instead of the formation of Si-O-Si-bonds. Still another object of this invention is to provide a process for preparing organosiloxane-oxyalkylene-blockcopolymers with a minimum of cross-linking. A further object of this invention is to provide a means for readily removing the catalyst.

The foregoing objects and others which will become apparent from the following description are accomplished in accordance with this invention, generally speaking, by providing a process for the preparation of organosiloxane-oxyalkylene-blockcopolymers in which the polyoxyalkylene blocks are bonded to the organopolysiloxane blocks by Si-O-C-bonds which comprises reacting organopolysiloxanes having Si-bonded hydrogen atoms with polyoxyalkylene compounds having at least one alcoholic hydroxyl group in the presence of a catalytic amount of alkali substances, in which the alkali substances are insoluble under the reaction conditions and have a surface area of at least 20 m.²/g.

The organopolysiloxanes containing Si-bonded hydrogen atoms which may be used in the process of this invention are the same as those which have been, or could have been used in the production of organosiloxane-oxyalkylene-blockcopolymers in which the polyalkylene blocks are linked to the organopolysiloxane blocks by Si-O-C-bonds through the reaction of Si-bonded hydrogen containing organopolysiloxanes with polyalkylene compounds having at least one alcoholic hydroxyl group. These polysiloxanes may be represented, for example, by the general formula:

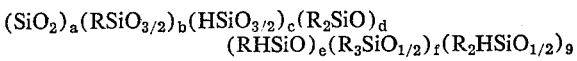

in which R represents a monovalent hydrocarbon radical having up to 18 carbon atoms which are free of aliphatic unsaturation, $a$, $b$, $c$, $d$, $e$, $f$ and $g$ are always 0, or a positive number; $a+b+c$ is a positive number, $d+e$ is at least 1 and $f+g$ is equal to $a+b+c+2$, with the rule that when $c$ is 1, $a+b+e+f$ is a positive number.

Because of their availability, it is preferred that the orgonopolysiloxanes having Si-bonded hydrogen atoms be prepared from the hydrolysis of silanes having the general formula:

wherein R is the same as above, $m$ and $n$ are always 0, or whole numbers having a value of 1, 2, or 3, the sum of $m$ and $n$ is no greater than 3 and the average value of $n$ and $m$ is always greater than 0 and the average value of $n$ is at least twice as large as the average value of $m$. Generally the average value of $m$ is from 0.005 to 0.4, preferably from 0.1 to 0.3.

It is preferred that the average value of $n$ be from 0.8 to 2.2. In the silanes of the above-indicated formula, $m$ generally has a value of 1.

Examples of suitable hydrocarbon radicals represented by R are alkyl radicals, such as methyl-, ethyl-, propyl-, butyl- and octadecyl radicals; cycloalkyl radicals such as a cyclohexyl radical; aryl radicals, such as the phenyl-, or tolyl- radicals; and arylalkyl radicals, such as the benzyl-, or beta-phenylethyl radicals. It is preferred that at least 90 percent of the R radicals be methyl radicals of their availability.

The organopolysiloxanes having Si-bonded hydrogen atoms which are used in the process of this invention may be prepared by adding a chlorosilane, or a mixture of such chlorosilanes to a mixture of water and solvent with agitation, separating the aqueous layer from the organic layer and thereafter washing the organic layer with water until it is free of acid. The water is removed from the organic layer, for example, by allowing it to stand over water-free sodium sulfate, or by means of azeotropic distillation. An additional advantage of the process of this invention is that it can be carried out with the thus obtained solution without prior isolation of the organopolysiloxane.

In addition to the siloxane groupings, the organopolysiloxanes having Si-bonded hydrogen atoms may also contain Si-O-bonded organic radicals (R), Si-bonded hydroxyl groups and Si-bonded alkoxy groups, such as methoxy-, or ethoxy-groups.

Examples of solvents which may be used in the above mentioned hydrolysis as well as in the process of this invention, especially at ambient temperature and 760 mm. Hg (abs.) are: liquid hydrocarbons, such as petroleum ether, naphtha, benzene, toluene and xylene; ethers, such as n-butylether, diethyl ether and ethylene glycol dimethyl ether; and such ketones as acetone, ethylmethyl ketone and dibutyl ketone.

The polyoxyalkylene compounds having at least one alcoholic hydroxyl group which may be employed in the process of this invention, may be the same as those which were employed heretofore in the production of organosiloxane-oxyalkylene-blockcopolymers in which the polyoxyalkylene blocks are linked to the organopolysiloxane blocks by an Si-O-C-bond, through the reaction of organopolysiloxanes containing Si-bonded hydrogen atoms with polyoxyalkylene compounds having at least one alcoholic hydroxyl group. Preferably the polyoxyalkylene compounds which have at least one alcoholic hydroxyl group correspond to the general formula:

$$R'O(C_pH_{2p}O)_xH,$$

where $R'$ is hydrogen, or a monovalent hydrocarbon radical having up to 18 carbon atoms which is free of aliphatic unsaturation, $p$ is a number of from 2 to 4 and $x$ represents a whole number having a value of at least 2 and more preferably from 5 to 100.

Examples of suitable hydrocarbon radicals represented by $R'$ are methyl-, ethyl-, propyl-, butyl-, octyl-, octadecyl-, cyclohexyl-, phenyl-, benzyl-, t-butylphenyl- and octylcresyl radicals.

It is preferred that the polyoxyalkylene compounds having at least one alcoholic hydroxyl group be employed in an amount sufficient to provide at least 1 gram/mol of alcoholic hydroxyl group for each gram/atom of Si-bonded hydrogen atoms in the organopolysiloxanes and more preferably, an excess of up to 10 percent by weight of polyoxyalkylene compounds having at least one hydroxyl group may be employed in the process of this invention.

Suitable examples of polyoxyalkylene compounds which may be employed in this process are ethylene glycol monoethyl ether, ethylene glycol diethyl ether, diethylene glycol monoethyl ether, diethylene glycol diethyl ether, ethylene glycol monomethyl ether, ethylene glycol monopropyl ether, ethylene glycol mono-n-butyl ether, ethylene glycol mono-isobutyl ether, ethylene glycol mono-isoamyl ether, ethylene glycol monohexyl ether, ethylene glycol monooctyl ether, ethylene glycol monophenyl ether, ethylene glycol monobenzyl ether, diethylene glycol monobutyl ether, diethylene glycol monohexyl ether, diethylene glycol monobenzyl ether, mixtures of polyethylene and polypropylene glycols and the like.

The alkali substances used in the process of this invention should be insoluble under the reaction conditions and have a surface area of at least 20 m.$^2$/g. The numerical values indicated in the description for the surfaces of the catalysts employed according to this invention, relate to surface areas, measured according to the BET-method (see Brunauer, Emmet and Teller in "Journal of the American Chemical Society" Vol. 60, pages 309 ff.). Although there is no upper limit for the surface area of the catalyst employed pursuant to this invention, it is preferred that the surface area of the alkali substances which are used under the reaction conditions in an undissolved form, should not exceed about 800 m.$^2$/g. in order to avoid loss of reaction product by adsorption on the catalyst.

The alkalinity of the alkali substances which are present under reaction conditions in undissolved form, should preferably be of such an order that at 18° C. and in a 10 percent by weight aqueous suspension, these substances have a pH value of from 7.5 to 10.0.

Among the alkali substances which are insoluble under the reaction conditions with a surface of from 20 m.$^2$/g. to 800 m.$^2$/g. and a pH value of from 7.5 to 10.0 at 18° C. in a 10 percent by weight aqueous suspension, are: alkali reacting clay, alkali reacting earths and/or alkali reacting activated charcoals. Examples of such materials which have a surface area of 75 m.$^2$/g. and a pH of 7.5 to 8.5 in a 10 percent by weight aqueous suspension are alkali reacting earths, or alkali reacting clays having the following average chemical composition (percent by weight): $SiO_2(60\%)$, $Fe_2O_3(5.5\%)$, $Al_2O_3(20.0\%)$, $CaO(2.0\%)$, $MgO(3.5\%)$, $Na_2O+K_2O(1.0\%)$ and red heat loss (7.5%). These materials are obtained under the trade name "Tonsil 13" (the trade name "Tonsil" is a registered trademark of Sud-Chemie AG, 8 Munich, Germany). Also alkali reactings clays, such as activated sodium bentonite, having a surface area of 61 m.$^2$/g. and a pH value of 9.5 in a 10 percent by weight aqueous suspension at 18° C., with an average chemical composition (percent by weight): $SiO_2(58.0\%)$, $Fe_2O_3(6.1\%)$, $Al_2O_3(19.7\%)$, $CaO(2.3\%)$, $MgO(3.8\%)$, $Na_2O(1.3\%)$, $K_2O(1.1\%)$ and red heat loss (7.4%) may be used. This material is commercially available under the name "Montigel F" (the trade name "Montigel" is a registered trademark of Sud-Chemie AG, 8 Munich, Germany). An activated bentonite whose production is described in the literature, having a surface area of 35 m.$^2$/g. and a pH of 9.7 in a 10 percent by weight aqueous suspension at 18° C., with the following average chemical composition (percent by weight): $SiO_2(56.7\%)$, $Al_2O_3(20.2\%)$, $Fe_2O_3(5.5\%)$, $CaO(2.9\%)$, $MgO(4.3\%)$, $Na_2O+K_2O(2.7\%)$ and red heat loss (7.6%) may also be used as a catalyst in this invention. (This material may be obtained under the name "Bentonit M" from Sud-Chemie AG, 8 Munich, Germany.) An activated charcoal having a surface area of 750±50 m.$^2$/g., a pH of 9 to 10 in a 10 percent by weight aqueous suspension at 18° C. and having the following properties may also be employed in the process of this invention:

Raw material _____ Hardwood.
Porosity _____ Narrow pores.
Average radius in A _____ 3–10.
Ash content in wt./percent _____ <6.5.
Water solubles in wt./percent _____ <2.5.
Fineness in wt./percent <0.040 mm. ___ >80.

This material is available under the name "Brilonit normal" (the name "Brilonit" is a registered trademark of Lurgi Gesellschaft fur Warme and Chemotechnik mbH, 6 Frankfurt, Germany).

The alkali substances which are present under the reaction conditions in an undissolved form and which have a surface area of at least 20 m.$^2$/g. are effective in amounts as small as 0.05 percent by weight based on the total weight of the reactants employed. The upper limit for the amount of catalysts employed pursuant to the invention is dictated only by considerations of economy.

The reaction temperature is preferably in the range of from 20° C. to 180° C., more preferably in a range of from about 100° C. to 160° C.

The process which is the subject of this invention is preferably carried out at atmospheric pressure, i.e. at approximately 680 to 800 mm. Hg (abs.). If desired, higher, or lower pressures may be employed.

The process of this invention may be carried out batch wise, semi-continuously, or continuously by passing a mixture of the reactants in which the catalyst is suspended therein through a heated zone. Also the process may be carried out by conducting the reactants either in parallel flow, or in counter current flow through a stationary, or an agitated bed of the alkali catalysts. Generally, the reaction is considered to be terminated when gaseous hydrogen is no longer formed.

One advantage of the process of this invention is that the base material, or any of the resultant by-products need not be separated before the product is used as foam stabilizers in the production of foamed plastics, especially foamed polyurethane materials, as well as for other fields of application where organosiloxanes-polyoxyalkylene-blockcopolymers are used. Examples of other uses of these blockcopolymers are as demulsifiers for petroleum and polymer emulsions, as levelling agents for varnishes, as antistatic agents to be used e.g. on hydrophobe fibers, in cosmetics, such as hair grooming aids and skin care aids, fire extinguishing media, brightening agents, cleaning fluids for windshield washers, as thread lubricants, as emulsifiers for aqueous dispersions of organopolysiloxanes, especially wax-like organopolysiloxanes, of hydrocarbons, of plant parasite control media, or herbicides as well as rubber tube lubricants during the production of vehicle tires.

Various embodiments of this invention are further illustrated in the following examples in which all parts and percentages are by weight unless otherwise specified.

EXAMPLE 1

A suspension comprising 5 parts of an activated sodium bentonite having a surface area of 61 m.$^2$/g. and a pH value of 9.5 in a 10 percent by weight aqueous suspension at 18° C. and having an average chemical composition: $Si/_2(58.0\%)$, $Fe_2O_3(6.1\%)$, $Al_2O_3(19.7\%)$, $CaO(2.3\%)$, $MgO(3.8\%)$, $Na_2O(1.3\%)$, $K_2O(1.1\%)$, red heat loss (7.4%) in 50 parts of toluene is evenly distributed in a mixture containing 250 parts of a polyoxyalkylene compound of the formula:

$$HO(C_2H_4O)_{20}(C_3H_6O)_{20}n-C_4H_9$$

and 250 parts of toluene. The mixture thus obtained is added over a period of one hour to a solution maintained at reflux temperature which contains 100 parts of a mixed hydrolysate composed of 80 parts of methyltrichlorosilane, 10 parts of methyldichlorosilane and 10 parts of trimethylchlorosilane and 200 parts of toluene. After maintaining the solution at reflux temperature for 1 hour, it is filtered to remove the catalyst and the toluene is removed by distillation from the filtrate. The resulting product is a light-yellow oil having a viscosity of about 1580 cst. at 25° C. which exhibits good foam stabilizing action in the production of polyurethane foams. The yield is about 100 percent of theoretical.

EXAMPLE 2

To about 500 parts of a solution of a mixed hydrolysate composed of 80 parts of dimethyldichlorosilane, 10 parts of methyldichlorosilane and 10 parts of trimethylchlorosilane in 100 parts of xylene are added about 500 parts of polyglycol corresponding to the formula:

$$HO(C_2H_4O)_8H$$

and 6 parts of activated charcoal having a surface area of 750±50 m.$^2$/g., whose 10 percent by weight aqueous suspension has a pH value of from 9 to 10 at 18° C. The resulting mixture is slowly heated under reflux to the boiling point. After 2 hours at reflux temperature, the xylene is distilled from the mixture. The residue is separated from the catalyst by filtration using diatomaceous earth as a filtering aid. The filtrate is a light-yellow oil having a viscosity of about 850 cst. at 25° C. The yield is about 100 percent of theoretical.

Although specific examples of the invention have been described, it is not intended to limit the invention solely thereto but to include all the variations and modifications falling within the spirit and scope of the appended claims.

What is claimed is:

1. A process for the production of organosiloxane-oxyalkylene-blockcopolymers in which the polyoxyalkylene blocks are linked to the organopolysiloxane blocks by Si-O-C-bonds, which comprises reacting an organopolysiloxane containing Si-bonded hydrogen atoms with polyoxyalkylene compounds having at least one alcoholic hydroxyl group in the presence of alkali substances which are insoluble under the reaction conditions and have a surface area of at least 20 m.$^2$/g., said alkali substances are selected from the group consisting of alkali reacting clays, alkali reacting earths and alkali reacting activated charcoals.

2. The process of claim 1 wherein the alkali substances have a surface area of from 20 to 800 m.$^2$/g.

3. The process of claim 1 wherein the alkali substances in a 10 percent by weight aqueous suspension have a pH of from 7.5 to 10.0 at 18° C.

References Cited
UNITED STATES PATENTS 3,555,063   1/1971   Nakajima et al. ___ 260—448 R DANIEL E. WYMAN, Primary Examiner P. F. SHAVER, Assistant Examiner U.S. Cl. X.R.

260—46.5 R